United States Patent [19]

Lippmann et al.

[11] Patent Number: 5,408,418
[45] Date of Patent: Apr. 18, 1995

[54] FUEL WOBBLER

[75] Inventors: Raymond Lippmann, Ann Arbor; James E. Nelson, Waterford; Michael J. Schnars, Clarkston; James R. Chintyan, Davison; Mark C. Hansen, Ann Arbor, all of Mich.

[73] Assignee: Delco Electronics Corporation, Kokomo, Ind.

[21] Appl. No.: 944,154

[22] Filed: Sep. 11, 1992

[51] Int. Cl.⁶ ............................................. G01C 25/00
[52] U.S. Cl. .............................. 364/509; 364/571.046; 340/450.2; 340/618; 73/290 R
[58] Field of Search ............. 73/290 R, 430; 340/618, 340/450, 450.2, 612; 328/129.1, 130.1; 377/20; 364/509, 571.01, 571.02, 571.04

[56] References Cited

U.S. PATENT DOCUMENTS

| | | | |
|---|---|---|---|
| 3,115,615 | 12/1963 | Saper | 340/37 |
| 3,983,549 | 9/1976 | Akita et al. | 340/206 |
| 3,990,073 | 11/1976 | Duttweiler | 340/347 |
| 4,102,191 | 7/1978 | Harris | 73/313 |
| 4,243,974 | 1/1981 | Mack | 340/347 |
| 4,250,750 | 2/1981 | Martinec et al. | 73/308 |
| 4,309,692 | 1/1982 | Crosby | 340/347 |
| 4,386,406 | 5/1983 | Igarashi et al. | 364/442 |
| 4,470,296 | 9/1984 | Kobyashi et al. | 73/113 |
| 4,481,597 | 11/1984 | Robbins | 364/604 |
| 4,509,044 | 4/1985 | Yachida | 364/509 |
| 4,513,277 | 4/1985 | Moore et al. | 340/59 |
| 4,546,343 | 10/1985 | Higgins et al. | 340/347 |
| 4,614,114 | 9/1986 | Matsumoto et al. | 73/313 |
| 4,635,043 | 1/1987 | Kronenberg et al. | 340/618 |
| 4,760,736 | 8/1988 | Huynh | 73/430 |
| 4,768,377 | 9/1988 | Habelmann et al. | 73/313 |
| 4,810,953 | 3/1989 | Huynh | 324/120 |
| 4,890,491 | 1/1990 | Vetter et al. | 73/290 |
| 4,897,822 | 1/1990 | Korten et al. | 367/124 |
| 4,912,646 | 3/1990 | Cerruti | 364/509 |
| 4,916,535 | 4/1990 | Volodchenko et al. | 358/101 |
| 4,982,350 | 1/1991 | Perna et al. | 364/569 |
| 4,991,435 | 2/1991 | Colarossi | 73/313 |
| 5,257,300 | 10/1993 | Bennett et al. | 73/430 |

OTHER PUBLICATIONS

Electronic Circuits–Digital and Analog., Charles A. Holt, pp. 794–795, 1978.

Primary Examiner—Emanuel T. Voeltz
Assistant Examiner—Craig Miller
Attorney, Agent, or Firm—Anthony L. Simon; Jimmy L. Funke

[57] ABSTRACT

An apparatus for fuel level display systems comprises a fuel level sender providing a fuel level signal, a short period filter for filtering the fuel level signal through a short time constant filter, a long period filter for filtering the fuel level signal through a long time constant filter, a signal selector for selecting the long period filter output if the fuel level is above a trip point and for selecting the short period filter if the fuel level is below the trip point, and a display device for displaying a level of fuel in the tank in response to the selected signal.

17 Claims, 10 Drawing Sheets

FUEL WOBBLER

The subject of this specification is related to copending applications, U.S. application Ser. No. 07/944,158, filed Sep. 11, 1992, entitled "Slew Rate Limiter With Asymmetrical Operation," now pending, and U.S. Pat. No. 5,325,314, entitled "Electronic Gauge Transform," and U.S. application Ser. No. 07/944,145, entitled "Maintaining Ratiometric Data in Electronically Manipulated Signal Processing Systems," now U.S. Pat. No. 5,371,500 and U.S. Pat. No. 5,345,398, entitled "Gauge Glider," all filed concurrently with this specification, assigned to the assignee of this invention and the disclosures of which are incorporated by reference.

This invention pertains to processing measurement data, and more particularly to the processing of fuel sender data in motor vehicles.

BACKGROUND OF THE INVENTION

In vehicle fuel measurement and display systems, the measurement and display of fuel level to the vehicle operator may be affected by vehicle motion. The varying accelerations exerted on a vehicle fuel tank may, for example, cause wave motion of the fuel in the fuel tank. This wave motion may cause the fuel sensor to output a varying signal having an effect that may then be transferred to the display as a fluctuating needle. To compensate for the effects of variations in the signal output by the fuel sensor, it is known to filter the output signal before it is used to drive a display, thereby removing variations from the signal and providing a stable display of the fuel level to the vehicle operator.

Various types of signal processing systems have been developed for various types of processing of fuel level sensor data in attempts to provide more accurate and more aesthetically pleasing fuel level displays. Further improvements are still sought to adapt the fuel measurement and display systems to the characteristics of the vehicle to provide optimum accuracy in the fuel level display system in an ergonomic manner.

SUMMARY OF THE PRESENT INVENTION

The present invention is an apparatus directed to compensate for the effects of fuel level on variations in fuel sender signals. In short, the magnitude of the sender fluctuations is not as great when the tank is nearly empty as it is when the tank is full because there is not as much fuel to lift the float when the fuel sloshes. Consequently, a long filter constant in the data processor is not necessary when the tank is nearly empty. Additionally, when the tank is nearly empty a short period filter is desirable because it has a quicker response in reflecting changes in fuel level. However, switching between a short period filter and a long period filter as a certain level (the trip point) of fuel is reached may cause erratic pointer movements, such as the needle fluctuating loosely below the trip point, and then appear to stick at the trip point, as the long period filter is switched on.

The circuit apparatus of this invention implements a data processing system for a fuel level display that includes two filters, a short period filter and a long period filter, in a manner that provides smooth and fluid transitions between the short and long period filters.

The apparatus of this invention may serve as a low fuel warning indicator by setting the time constant of the short period filter small enough that the fuel gauge fluctuates with fuel slosh in the tank when the fuel level is below the trip point. The fluctuating fuel gauge may serve as a reminder to the vehicle operator to add fuel to the fuel tank.

Structurally, this invention comprises, means for sensing fuel level and providing a fuel level signal, means for filtering the fuel level signal through a long time constant filter and for providing a long period filter output signal, means for filtering the fuel level signal through a short time constant filter and for providing a short period filter output signal, means for selecting the long period filter output signal if the fuel level is above a trip point and for selecting the short period filter output signal if the fuel is below the trip point, and means for indicating the fuel level in a display in response to the selected filter output signal.

BRIEF DESCRIPTION OF THE INVENTION

FIG. 1 is a schematic illustration of the apparatus of this invention;

FIGS. 2a–2c and 3 comprise a schematic diagram of the preferred implementation of this invention.

FIGS. 4 and 5 comprise an illustration of an alternative implementation of this invention.

DETAILED DESCRIPTION OF THE INVENTION

Figure 1:
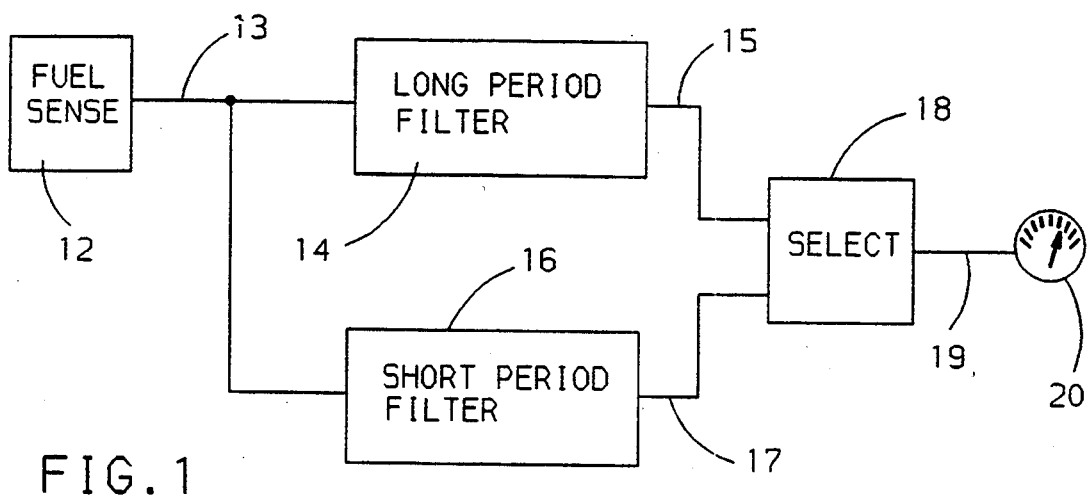

Referring to FIG. 1, means 12 for sensing the fuel level in the vehicle fuel tank (not shown) provides a fuel level sense signal on line 13 indicative of the instantaneous fuel level sensed by the sensing means 12. If the vehicle is in motion and the fuel tank is submitted to varying accelerations by the vehicle motion, the fuel level sense signal on line 13 may vary with wave motion and/or sloshing of fuel in the fuel tank.

The fuel level sense signal on line 13 is fed to long period filter 14 (also referred to as the long time constant filter), comprising means for filtering the level sense signal through a long time constant filter. The long period filter 14 provides a long period filter output signal on line 15, which is connected to the select means 18. The fuel level sense signal on line 13 is also fed to short period filter 16 (also referred to as the short time constant filter), comprising means for filtering the fuel level sense signal through a short time constant filter. The short period filter 16 provides a short period filter output signal on line 17, which is also connected to the select means 18.

Select means 18 selects between the short period filter output signal and the long period filter output signal and outputs the selected signal on line 19 which is used to drive a display 20 of any known type for use to indicate fuel levels. In general, the long period filter output signal is selected when the fuel in the fuel tank is above a trip point corresponding to a fuel level at which the time constant of fluctuations of signals on line 13 tends to increase. Conversely, the short period filter output signal is selected when the fuel in the fuel tank is below the trip point and the time constant of fluctuations on line 13 is shorter.

The trip point generally corresponds to a point in which the fuel level is nearly empty, since the most rapid fluctuations in the fuel level signal occur when the tank is nearly empty. The exact trip point varies from implementation to implementation. If desired the short period filter may be set with a time constant short enough that fluctuations are not filtered completely out of the signal, so that a fluctuating fuel gauge may serve as an indicator to an operator that the fuel tank is mostly empty and should be filled.

In a particular example, at vehicle start up, the system shown is reset to a mode in which the short period filter output signal on line 17 is selected for a period of time so that the level of fuel indicated by display 20 rapidly approaches the actual fuel level in the tank. Thereafter, in response to the magnitude of the short period filter output signal on line 17, the select means controls selection between the short period output signal on line 17 and the long period output signal on line 15. Preferably, select means 18 also has a criteria that the signal on line 15 be near in magnitude to the signal on line 17 before switching the selected signal. This criteria will prevent the display 20 from appearing to jump between levels at the trip point.

Figure 2A:
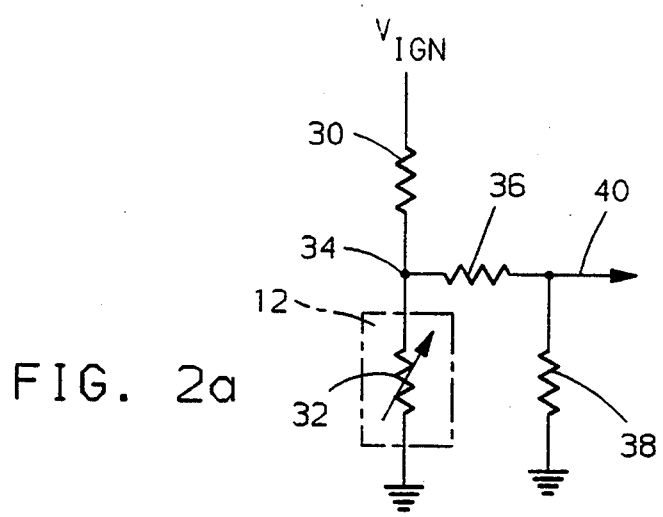
Figure 2B:
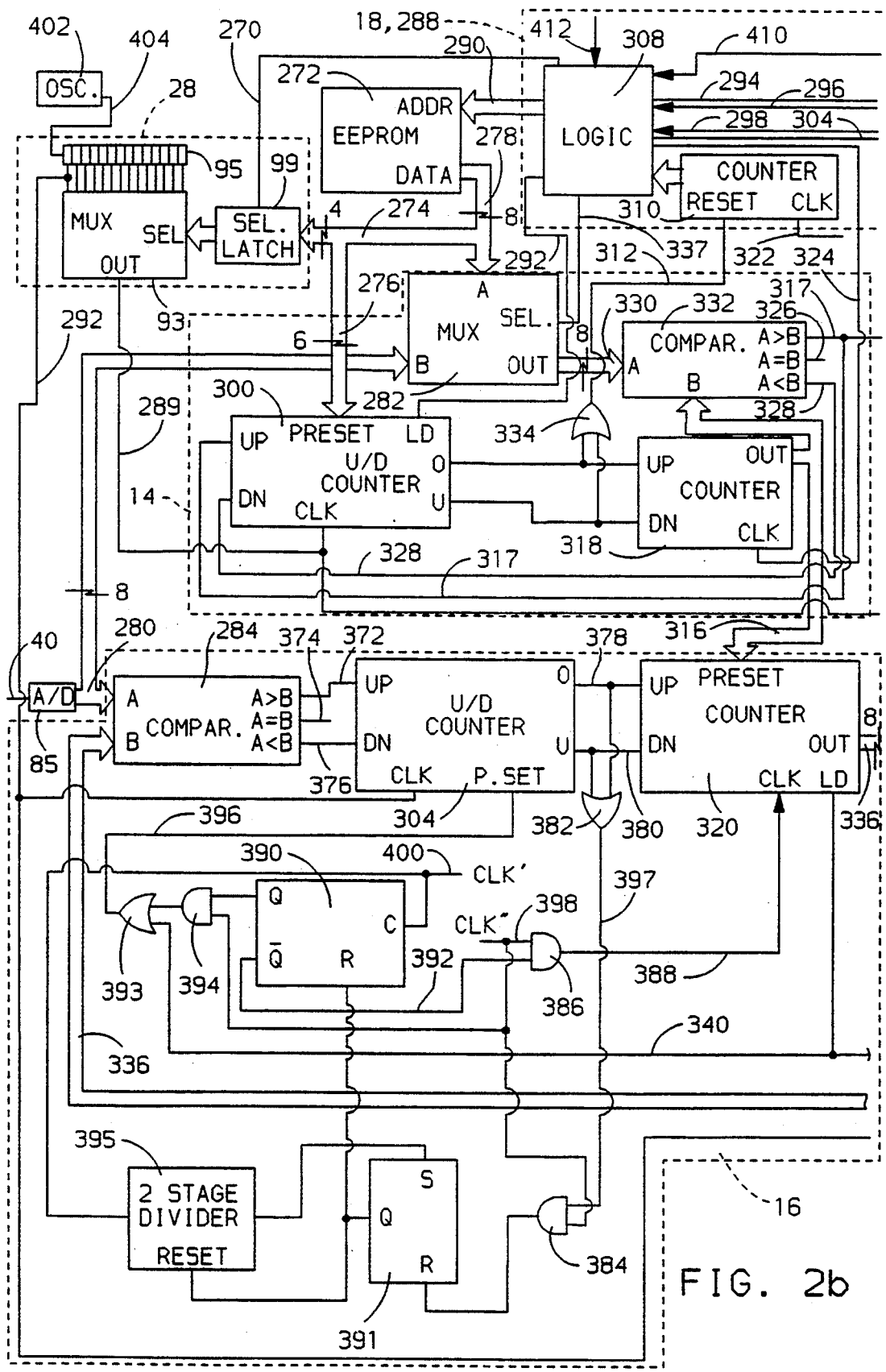
Figure 2C:
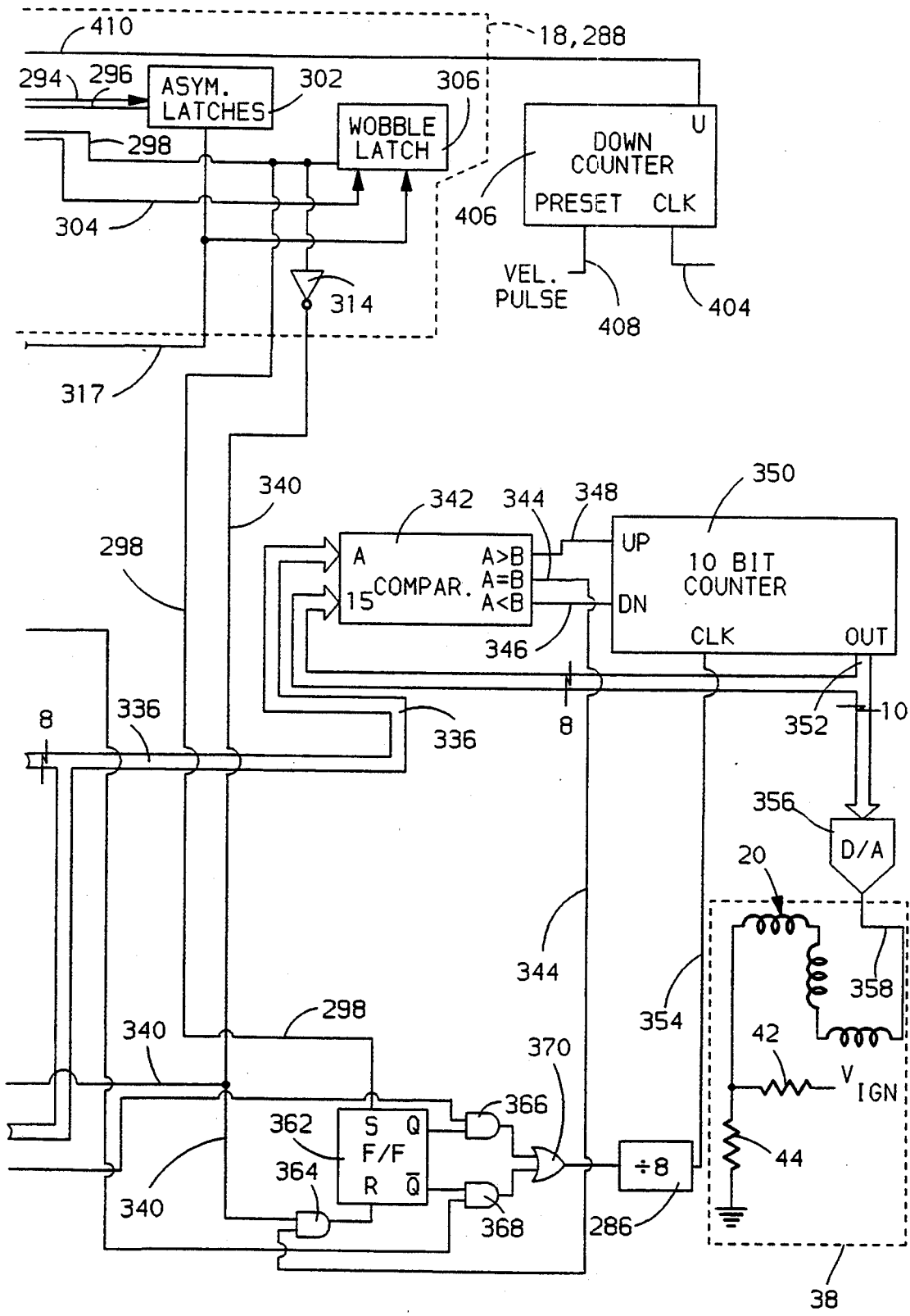
Figure 3:
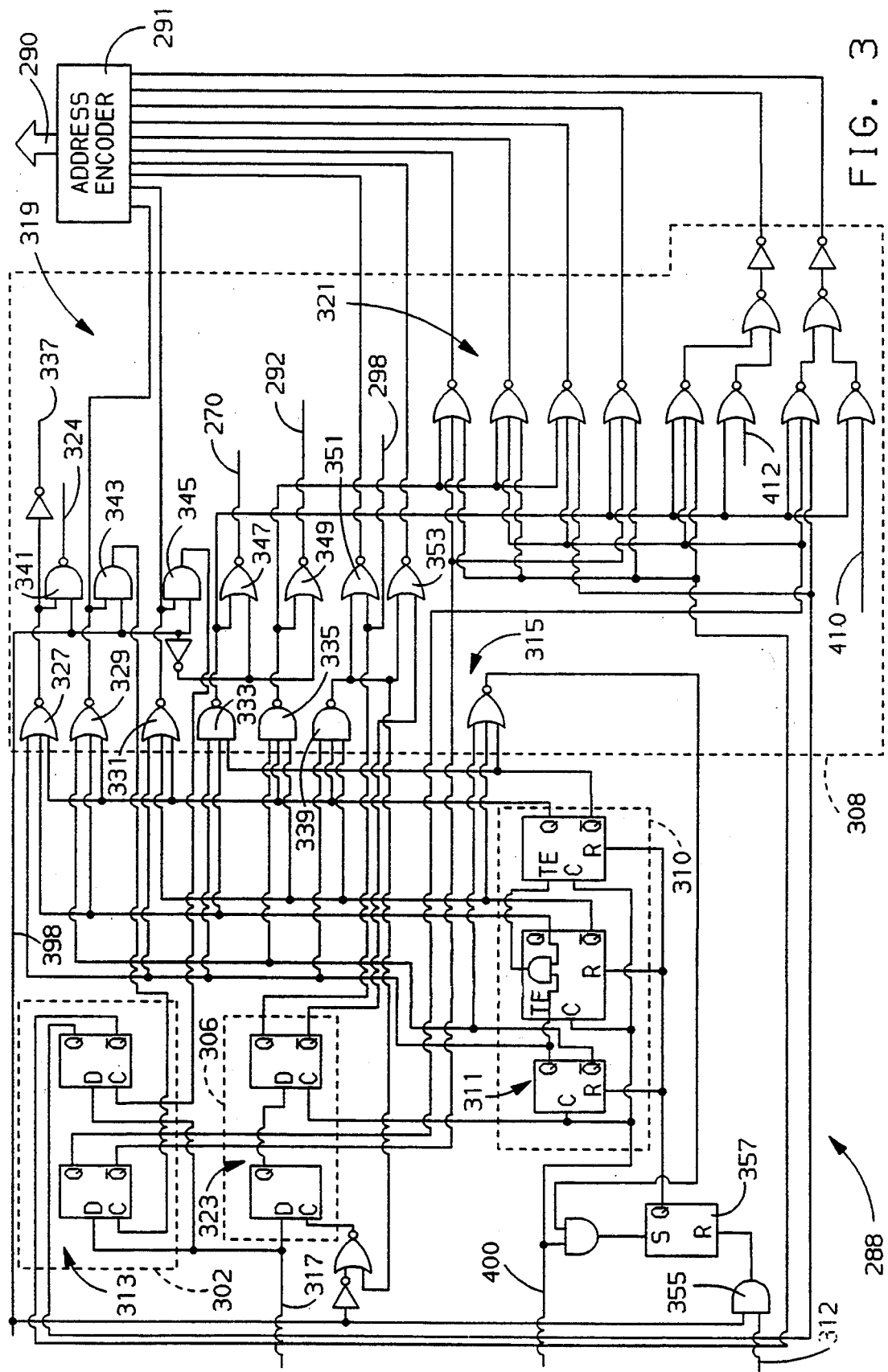

Referring to FIGS. 2 and 3, the means for sensing fuel level 12 comprises variable resistance fuel sender 32 whose resistance changes with the level of fuel at the sender 32. For example, sender 32 may comprise a variable resistor with a float arm controlling the output resistance of the variable resistor. In the event of wave motion or sloshing of fuel in the fuel tank, the float arm moves up and down with the surface of the fuel in the tank, causing the impedance of sender 32 to vary.

Sender 32 is connected in series with load resistor 30 between the vehicle ignition voltage supply line and ground. The signal on line 34 is a voltage signal that varies with the impedance of sender 32, and the sensed level of the fuel in the tank. Resistors 36 and 38 comprise a voltage divider that provides a signal on line 40 in proportion to the signal on line 34 at a voltage level suitable for processing by the remainder of the circuitry, which is preferably incorporated into an integrated circuit.

The signal on line 40 is input to A/D converter 85, which outputs a corresponding digital signal on bus 280. Bus 280 is input to long period filter 14 and short period filter 16. Long period filter 14 filters the data asymmetrically in accordance with the disclosure of the above mentioned copending patent application, U.S. application Ser. No. 07/944,158, filed Sep. 11, 1992, now pending, in which the asymmetrical operation of the long period filter 14 is set forth in detail. Briefly, the long period filter 14 filters the fuel sender data asymmetrically to compensate for the asymmetrical wave motion in a fuel tank. In the implementation shown, the asymmetrical filter has three regions of asymmetry, with a fuel level break point "a" determining the boundary between the first and second regions of asymmetry and a fuel level break point "b" determining the boundary between the second and third regions of asymmetry.

Bus 280 provides the digital data signal to the A input of comparator 284 for short period filtering and to multiplexer 282, which is normally selected through line 337 so that the data signal on bus 280 is coupled to bus 330, which is in turn connected to the A input of comparator 332 for long period filtering. The B input of comparator 284 is coupled to bus 336, the output bus of counter 320 in the short period filter 16 and the B input of comparator 332 is coupled to bus 316, the output bus of counter 318 in the long period filter 14.

Both comparators 284 and 332 have three output lines, an A>B line (372 and 317), and A=B line (374 and 326) and an A<B line (376 and 328), on which output signals respectively occur when the A and B input signals follow the corresponding logic functions. For comparator 332, the A>B line 317 and A<B line 328 are connected to the up and down inputs of up/down counter 300. Likewise, for comparator 284, the A>B line 372 and the A<B line 376 are connected to the up and down inputs of up/down counter 304.

The select means 18 includes state machine 288 comprising logic 308, asymmetry latches 302, wobble latch 306 and counter 310. State machine 288 controls the operation of the long period filter and selects the wobble mode, i.e., whether or not the short period filter 16 is activated. The up/down counter 300 generally receives a slow clock signal through line 289 and up/down counter 300 counts up and/or down in response to the signals on output lines 317 and 328 of comparator 332 until an overflow or underflow condition occurs. When an overflow or underflow condition occurs, a signal is provided via OR gate 334 and line 312 to counter 310 of state machine 288, which starts a cycle of the state machine.

When the state machine 288 cycles, it cycles through a series of states, controlled by counter 310. In the first state, State 0, a pulse signal is provided on line 324 to counter 318, clocking counter 318 one count up or one count down in accordance with whether up/down counter 300 is overflowing or underflowing.

State machine 288 then cycles to State 1, during which state logic circuitry 308 provides a word on bus 290, addressing memory 272 to provide a word on bus 278 representing the break point between the first and second asymmetry regions of the circuit. Also in State 1, a signal is provided on line 337 selecting the A input to multiplexer 282, which is connected to bus 278, the data output bus for memory 272. The signal on line 337 maintains this value until the state machine returns to State 0. A comparison is made by comparator 332 between break point a and the output of counter 318 on bus 316. A signal on line 317 that is logic 1 if the signal on bus 316 is less than point a and logic 0 is the signal on bus 316 is greater than point a is latched into asymmetry latches 302.

During the next state, State 2, logic circuitry 308 provides a word on bus 290, addressing memory 272, which provides a word on bus 278 representing break point b between the second and third asymmetry regions. Comparator 332 compares point b and the output of counter 318 on bus 316. The comparison result on line 317 is latched into asymmetry latches 302.

During State 3, an address word on bus 290 addresses a time constant from memory 272. The time constant is determined in response to the whether there is an initialization signal on line 412, e.g., from an initialization timer (not shown), and in response to a signal on line 410 from down counter 406. Down counter 406 is preset to a starting count with every pulse through line 408 from a standard vehicle velocity sensor (not shown). If counter 406 does not receive a velocity pulse on line 408, then counter 406 counts down to an underflow condition, and outputs an underflow signal on line 410, indicating that the vehicle is not moving. If the vehicle is not moving, a short time constant is desired because, with no vehicle motion, there is nothing to cause wave motion of the fuel, and therefore there is no need for heavy damping of the fuel sender signal.

The time constant also varies in response to the asymmetry range of the output signal on bus 316, as determined by asymmetry latches 302. The time constant is provided on bus 274, comprising four lines of bus 278, to the input of latch 99 in divider 28, and is latched into latch 99 with a signal on line 270 from logic circuitry 308. The output of latch 99 controls multiplexer 93, which couples one of the outputs of the series of fourteen dividers 95 to line 289.

The clock signal on line 289 is generally as follows. During initialization and when the vehicle is not moving (as determined by counter 406), the signal on line 289 is as fast as the fast clock signal on line 292. Otherwise, the signal on line 289 is relatively slow compared to the signal on line 292. Three possible slow clock frequencies are provided, one for every region of asymmetry as determined by asymmetry latches 302, with lower clock frequencies corresponding to higher levels of fuel in the tank.

During State 4, a word is provided on bus 290, responsive to asymmetry latches 302, addressing memory 272 to provide the proper asymmetry preset on bus 276, comprising six of the lines of bus 278. A load signal is provided on line 292, triggering counter 300 to load the asymmetry preset on bus 276 to the preset input of up/down counter 300. The asymmetry preset is the preset value that up/down counter 300 resets to after every overflow or underflow. The value of the asymmetry preset determines the asymmetrical operation of the long period filter.

During State 5, a word responsive to wobble latch 306 is provided on bus 290 to address from memory 272 the wobble trip point, which is provided on bus 278 and coupled to the A input of comparator 332. A>B output line 317 of comparator 332 is coupled to the wobble latch 306, which latches in a determination of whether the output of counter 318 on bus 316 is above or below the wobble point. If, before the comparison, the wobble latch 306 indicated that the short period filter was inactive (indicating that the fuel level was above the wobble trip point), then the wobble trip point addressed equals the value, trip point. If the wobble latch 306 indicated, before the comparison, that the short period filter was active, then the wobble trip point addressed equals the value, trip point plus delta, where the value of delta is relatively small compared to the value of trip point.

During the next state, the counter 310 is reset, resetting the state machine 288, and bringing line 337 high again so that the signal on bus 280 is again coupled to comparator 332. The complete cycle of the state machine takes less time than the period of the clock signal on line 289. This allows the state machine to run its cycle without interfering with the operation of up/down counter 300.

In the state machine 288, wobble latch 306 controls through lines 298 and 340 whether the short period filter is enabled. When the short period filter is not enabled, line 340 provides a command to the load input of counter 320. In response to the load command, counter 320 forces its output, connected to bus 336, to a value equal to its preset input, which is coupled to bus 316, the output of the long period filter 14. In this manner, output bus 336 carries the output signal of the long period filter 14 when the short period filter 16 is not activated.

When wobble latch 306 determines that the short period filter 16 is activated, counter 320 is responsive to up/down counter 304 and not bus 316. The short period filter operates as follows. Comparator 284 compares the signal on bus 280 to the filter output on bus 336. In response to the comparison results on lines 372 and 376, up/down counter 304 counts either up or down with the fast clock signal on line 292.

When counter 304 underflows or overflows, the circuitry including AND gates 384, 386 and 394, OR gate 393 and flip flops 390 and 391 comprise a second state machine for controlling the short period filter. The second state machine has only two states. In State 0, counter 320 is clocked once up or once down in accordance with the signals on line 378 and 380. In state 1, counter 304 is loaded with a hard wired preset value of 32, so that the short period filter 16 filters symmetrically. The short period filter 16 may be made asymmetrical if a designer so desires, but such is not the preferred embodiment.. The second state machine is reset by a signal output from two stage divider 395 to the set input of flip flop 391 and the circuitry then waits for another overflow or underflow signal from up/down counter 304. While both lines 378 and 380 are low, clock signals on line 388 do not affect counter 320.

Referring to FIG. 3, an example implementation of state machine 288 in select means 18 is shown. The circuit shown is just an example and any state machine which performs the equivalent circuit control may be used. In the state machine 288, counter 310 comprises three flip flops 311 that cycle the state machine 288 through the states at the desired rate determined by a first clock signal on line 400. The output of counter 310 controls the data output of logic circuit 308, comprising decoding gates 315, command gates 319 and word gates 321.

The asymmetry latches 302 comprise two latches 313, each storing one of the results of the two comparisons made during State 1 and State 2 of state machine 288. Wobble latch 306 comprises two latches 323.

In short, state machine 288 controls the outputs of gates 327-335 and gate 339. During State 0, gate 327 provides the output signal on line 337 that controls multiplexer 282. With a clock signal from line 398, gate 341 provides the command on line 324 to clock counter 318. During State 1, gates 329 and 343 provide the clock command for the first latch 313 to latch in the first asymmetry region comparison result. During State 2, gates 331 and 345 provide the clock command for the second latch 313 to latch in the second asymmetry region comparison result. During State 3, gates 333 and 347 provide the command on line 270 commanding divider 28 to latch into latch 99 the time constant. During State 4, gates 335 and 349 provide the signal on line 292 commanding up/down counter 300 to load the preset value. During State 5, gates 339, 351 and 353 provide the signal controlling the wobble latch 306, which outputs the signal on line 298 controlling whether the short period filter 16 is activated. In the last state, the counter 310 is reset to State 0 and held there waiting for a reset command from line 312 through gate 355 and flip flop 357. The remaining gates 321 provide part of the word output on bus 290 via address encoder 291, which is easily implemented by one skilled in the art.

Referring again to FIG. 2, the output bus 336, connected to the output of counter 320, carries the filter output signal. For reasons set forth in U.S. Pat. No. 5,325,314, incorporated by reference, a curve fitter may be implemented at the output of counter 320. The details of the curve fitter, if used, are set forth in U.S. Pat. No. 5,325,314, and are not set forth here because they are not central to the apparatus of this invention.

Bus 336 is coupled to the glider circuit comprising comparator 342, flip/flop 362 and ten bit counter 350, which function to increase the apparent resolution of the output signal. The "glider" circuit is the subject of U.S. Pat. No. 5,345,398.

When wobble latch 306 indicates selection of the short period filter, a logic high signal is output on line 298. The signal on line 298 sets flip/flop 362, which outputs a logic high signal to one input of AND gate 366. When flip/flop 362 is set, the fast clock signal on line 292 is coupled, via AND gate 366 and OR gate 370 to a three stage divider 286, which divides the clock signal by eight and clocks counter 350 with the resultant signal. Counter 350 counts at one eighth the clock rate of the signal on line 292, either up or down in accordance with the signals on lines 348 and 346. A count down signal on line 346 occurs when the signal on bus 336 is less than the eight most significant bits of the output of counter 350 on bus 352 and a count up signal on line 348 occurs when the signal on bus 336 is greater than the eight most significant bits of the signal on bus 352.

When wobble latch 306 selects the long period filter, line 340 goes high, providing a logic high signal to one input of AND gate 364. A clock frequency of one eighth of the fast clock signal on line 292, however, remains coupled to the clock input of counter 350 until a signal on line 344 indicates that the output of counter 350 equals (to eight significant bits) the signal on bus 336, which corresponds to the value on bus 316 since counter 320 is loading the output bus 336 from bus 316 at the preset input. When the signal occurs on line 344, AND gate 364 outputs a logic high signal that resets flip/flop 362. When flip/flop 362 is reset, the slow clock signal on line 289 is coupled via AND gate 368 and OR gate 370 to three stage divider 286, and a signal with one eighth the frequency of the clock signal on line 289 results on line 354, the clock input of counter 350. In this manner, if the vehicle fuel tank is being filled with fuel, the counter 350 will not switch to the slow clock signal until the output on bus 352 (and the display) matches the actual fuel level, as indicated by the signal on bus 336.

The output of counter 350 is a ten bit digital signal. However, only the eight most significant bits are connected to the B input of comparator 342. The ten bit signal on bus 352 provides an apparent resolution four times greater than that of the signal on bus 336, providing more continuous appearing transitions of an analog gauge display. The net result is that every step change in the signal on bus 336 results in four steps in the signal on bus 352, which causes a display to appear more continuous.

The output of counter 350 on bus 352 may be fed directly to digital to analog converter 356, whose analog output signal is used to drive a conventional three coil air core gauge display 20, which is biased by resistors 42 and 44 as shown.

In the circuitry set forth in this specification, the analog to digital converters and digital to analog converters are preferably ratio-metrically biased to the vehicle ignition voltage in accordance with the teachings of above mentioned copending patent application, U.S. application Ser. No. 07/944,145, filed Sep. 11, 1992, now U.S. Pat. No. 5,371,500.

Figure 5:
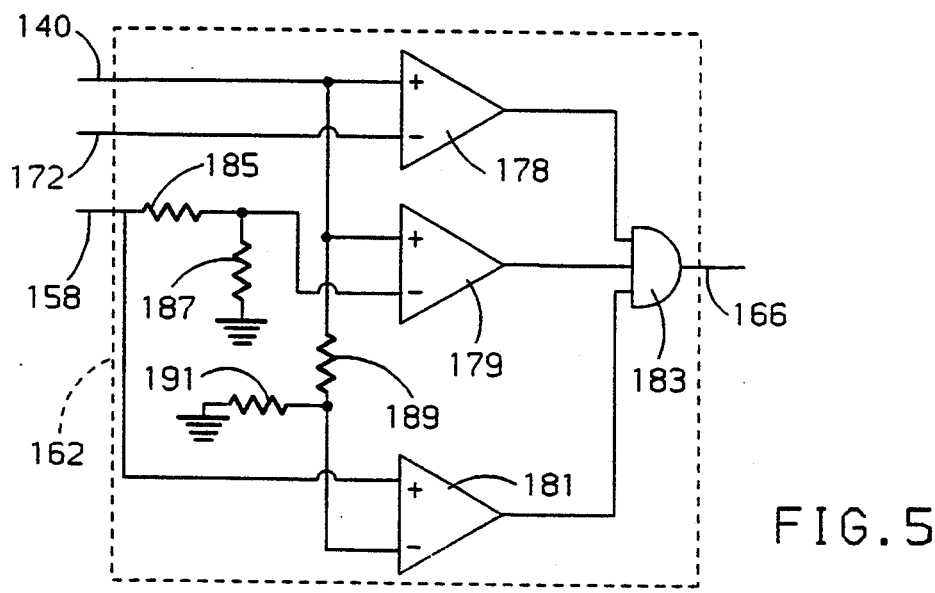
Figure 4:
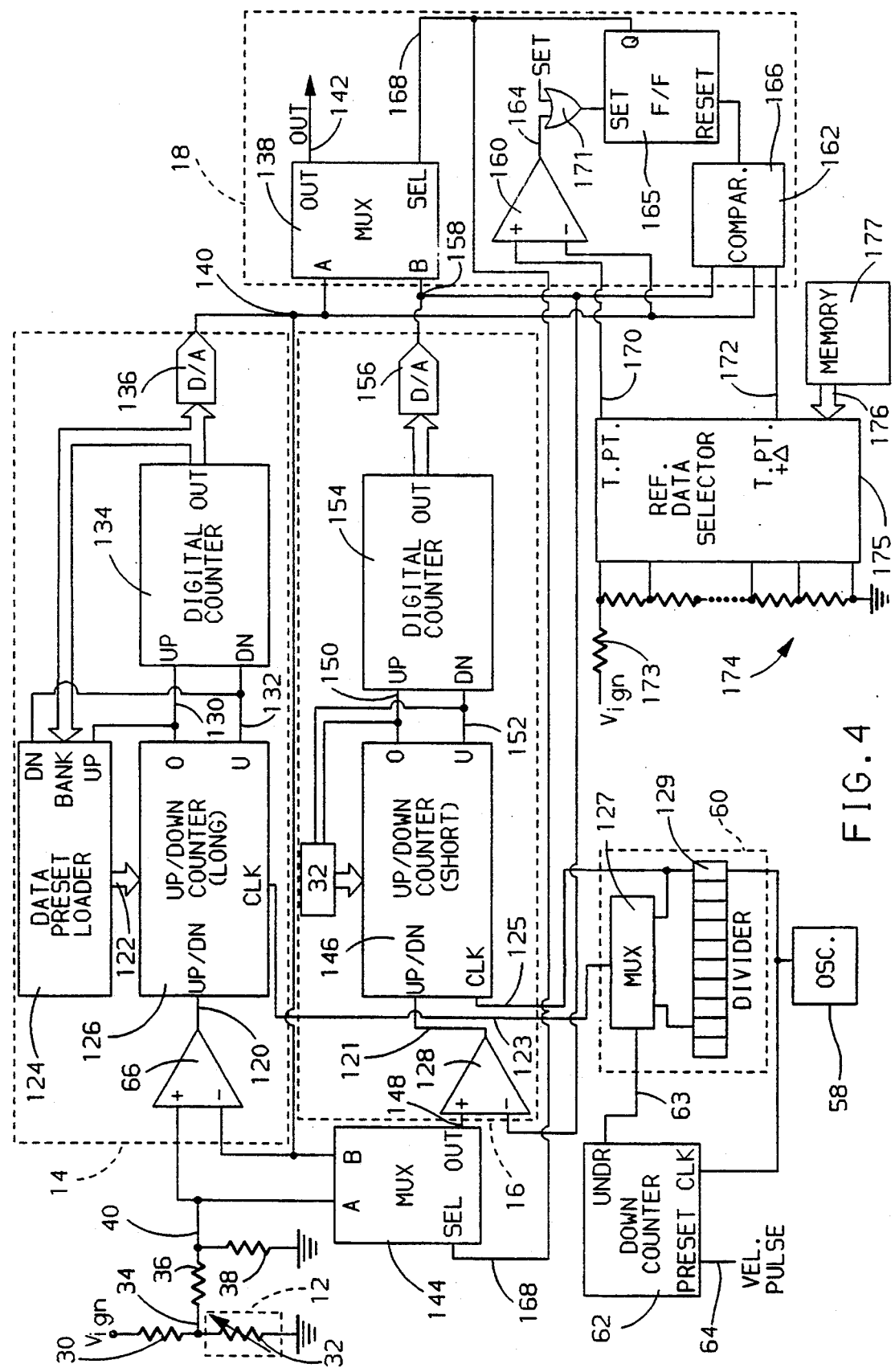

Referring to FIGS. 4 and 5, an alternative implementation uses analog comparators 66 and 128 instead of the digital comparators 282 and 284 used in the circuit of FIG. 2. The circuit functions as follows.

The signal on line 40 is connected to the non-inverting input of comparator 66 and to one input of multiplexer 144. The signal on line 40 is compared, at comparator 66, with the analog output signal of the long period filter 14 on line 140. The long period filter 14 comprises comparator 66, up/down counter 126, data preset loader 124, digital counter 134 and digital to analog converter 136. The output of comparator 66 on line 120 is fed to the up/down counter 126. Up/down counter 126 and counter 134 are identical to like components 300 and 318 in FIG. 2. Data preset loader 124 selects the preset input for up/down counter 126 in response to the signals on lines 130 and 132 and on the output of counter 134. An example implementation of data preset loader 124 may be a memory unit addressed by the output of counter 134 and selected by the signals on lines 130 and 132. Another example implementation of data preset loader 124 comprises a multiplexer that selects between different preset signals in accordance with the output of counter 134 and the signals on line 130 and 132.

The up/down counter 126 receives a slow clock pulse on line 123 to achieve a relatively long time constant. The long period filter 14 has a long enough constant to eliminate erratic needle motion due to fuel slosh and the preset inputs, controlled by data preset loader 124 in response to the output of digital counter 134, controls the desired asymmetry of the filter.

The digital output of counter 114 is fed to digital to analog converter 136, which outputs an analog long period filter output signal on line 140. The signal on line 140 is fed into the multiplexer 138 in select means 18 and output on line 142 if selected. The signal on line 140 is also fed into multiplexer 144, comparator 160 and comparison circuit 162. To select the output of long period filter 14, multiplexer 138 is selected, through line 168 in response to comparators 160 and 162 so that the signal on line 140 is output to line 142, which is used to drive a display device. Also, when the long period filter is selected, the multiplexer 144 is selected so that the signal on line 140 is fed to the short period filter 16 through line 148, so that the short period filter output follows the long period filter output.

Short period filter 16 comprises comparator 128, up/down counter 146, digital counter 154 and digital to analog converter 156. The short period filter receives a relatively fast clock signal from divider 60 via line 125. Up/down counter 146 has a fixed preset for substantially symmetrical filtering, e.g., preset set at 32.

Up/down counter 146 has overflow and underflow outputs at lines 150 and 152, feeding the clock up and clock down inputs of digital counter 154. Digital counter 154 in the short period filter 16 outputs a signal, via D/A converter 156, to line 158, which is connected to one input of the multiplexer 138, to the inverting input of comparator 128 and to comparison circuit 162.

Comparator 160 is used to determine whether the output of the long period filter is below the trip point, which determines if a short period filter constant is appropriate. When the long period filter output on line 140 is below the trip point, comparator 160 provides an output signal on line 164 that sets flip flop 165. The signal at the Q output of flip flop 165 controls multiplexer 138 so that the signal on line 142 is the signal input from line 158 and controls multiplexer 144 so that the signal on line 40 is fed directly to comparator 128, in the short period filter 16. In this manner, the short period filter 16 supplies the output signal that appears on line 142 when output of the long period filter 14 is below the trip point.

Comparison circuit 162 provides two comparisons. It determines both if the value from the long period filter 14 is greater than trip point plus a predetermined amount, delta, and if the output of the short period filter 16 is within a short range of the long period filter 14. If both of these conditions are met, the output of comparison circuit 162 causes flip flop 165 to output a signal on line 168 that controls multiplexer 138 to couple the signal on line 140 to output line 142 and controls multiplexer 144 so that the signal on line 140, not the signal on line 40, is fed to the input of short period filter 16. In this manner, when the fuel level is above the trip point, the circuit outputs on line 142 the long period filter output signal and the short period filter output follows the output of the long period filter.

Use of comparator 160 and comparison circuit 162 to control which signals are output to line 142 and which signal is input to the short period filter 16 provides a smooth transition between the long period filter 14 and short period filter 16, preventing needle jumping, and providing hysteresis. The trip point for comparator 160 is set on line 170 through addressable data selector 175, receiving inputs from various taps on resistor chain 174, which is coupled between ground and ignition voltage via load resistor 173. The trip point plus delta reference is set on line 172 through data selector 175 so that the trip point plus delta reference is slightly higher than the trip point reference. Memory 177 feeds, through bus 176, the selection addresses for data selector 175. The memory 177 may be preset during manufacture of the circuit for the specific implementation.

Comparator 160 may be a simple comparator, similar to comparator 66, with input lines 140 and 170. An example implementation of comparison circuit 162 is shown in FIG. 5 and includes comparators 178, 179 and 181. Comparator 178 provides a positive signal to AND gate 183 if the long period filter value on line 140 is greater than the trip point plus delta value on line 172. Comparator 179 sets the upper limit on the allowable deviation of the long period filter signal on line 140 from the short period filter signal on line 158, through use of the resistor divider network comprising resistors 185 and 187. The preferred ratio of resistor 187 to resistor 185 is five to one. Likewise, comparator 181 sets the lower limit on the allowable deviation of the long period filter signal on line 140 from the short period filter signal on line 158, through use of resistor divider network comprising resistors 189 and 191. The preferred ratio of resistor 191 to resistor 189 is five to one. When all three comparators 178, 179 and 181 provide a positive output signal to AND gate 183, a positive signal appears on line 166, toggling flip flop 165 so that the long period filter output on line 140 is coupled to line 142 and to the input of short period filter 16.

The circuit in FIG. 4 also has a feature that speeds up the filter when the vehicle is not moving. This feature is used because heavy filtration is not needed unless the vehicle is moving, causing the tank to slosh. A velocity signal in the form of pulses is provided on line 64 from a standard vehicle velocity sensor. Pulses appear on line 64 in accordance with rotation of a member of the vehicle drive train, indicating vehicle motion, e.g., 4000 pulses per mile. Each pulse presets down counter 62 to a predetermined start value. When down counter 62 ceases to receive pulses on line 64, it counts down to zero, with pulses from oscillator 58, and outputs a signal at the underflow output, line 63, to multiplexer 127 in clock divider 60. When multiplexer 127 receives the underflow signal on line 63, it bypasses several of the dividers 129, increasing the frequency of the clock signal to line 123, which clocks up/down counter 126, reducing the time constants of the long period filter 14. In this manner, if the fuel tank is filled when the vehicle is at rest, the output signal quickly achieves the value indicating the new fuel level. Once the vehicle starts moving again, and a signal is provided on line 64, operation of the circuit at the normal clock rate continues.

At start-up, a set signal is placed on the second input to OR gate 171, to toggle flip flop 165 so that the short period filter 16 is activated.

The above described implementations of this invention are shown with asymmetrical filters of the type taught in the above mentioned copending patent application, U.S. application Ser. No. 07/944,158, filed Sep. 11, 1992, now pending. However, any appropriate form of signal filter, analog or digital, symmetric or asymmetric, may be used. Any type of gauge display, analog or digital, may be used as display 20. Additional data processing circuitry can be used with the circuit components shown to further process the fuel level data as a system designer may see fit.

Figure 6:
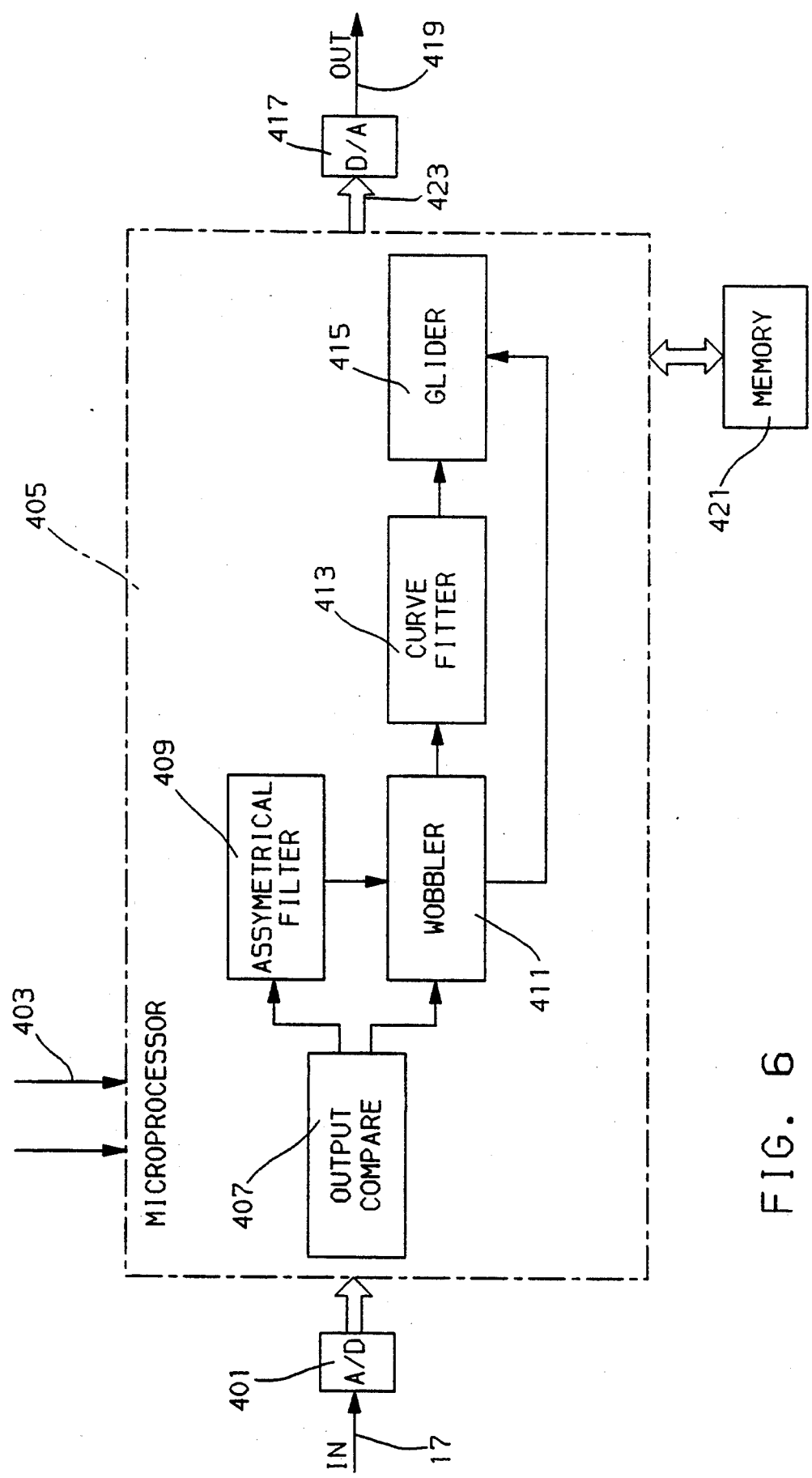
FIG. 6 illustrates an apparatus for a microprocessor implementation of this invention.

Referring to the microprocessor implementation shown in FIG. 6, the sender input signal on line 40 is converted to a digital signal by A/D converter 401 and provided to microprocessor 405. Microprocessor 405 performs the functions required by this invention in accordance with a control program stored in memory 421, the input received from A/D converter 401, and other input lines such as lines 403.

In implementation of the subroutine stored in memory 421, microprocessor 405 periodically compares (block 407) the input from A/D converter 401 with the output provided to D/A converter 417, and performs the asymmetrical filtration, wobbler, curve fitter and glider functions (blocks 409, 411, 413 and 415, respectively). The output is provided to D/A converter 417, which provides an output signal on line 419 used to drive any known type of analog display or gauge. Alternatively, the digital output signal on bus 423 may be directly used to drive a digital or bar graph display.

Figure 7A:
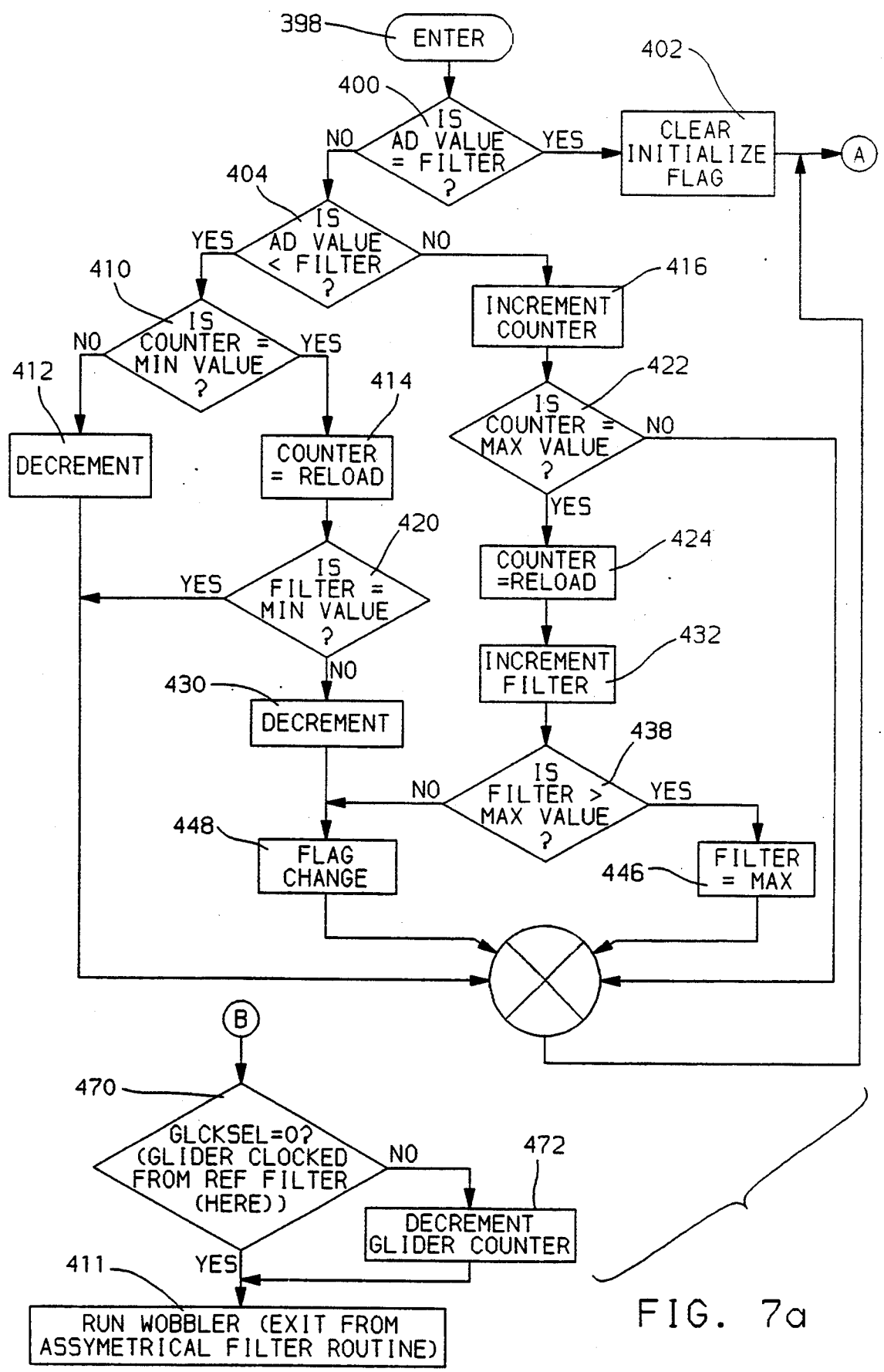
FIGS. 7a, 7b, 8 and 9 illustrate a flow routine for software implementation of this invention.
Figure 7B:
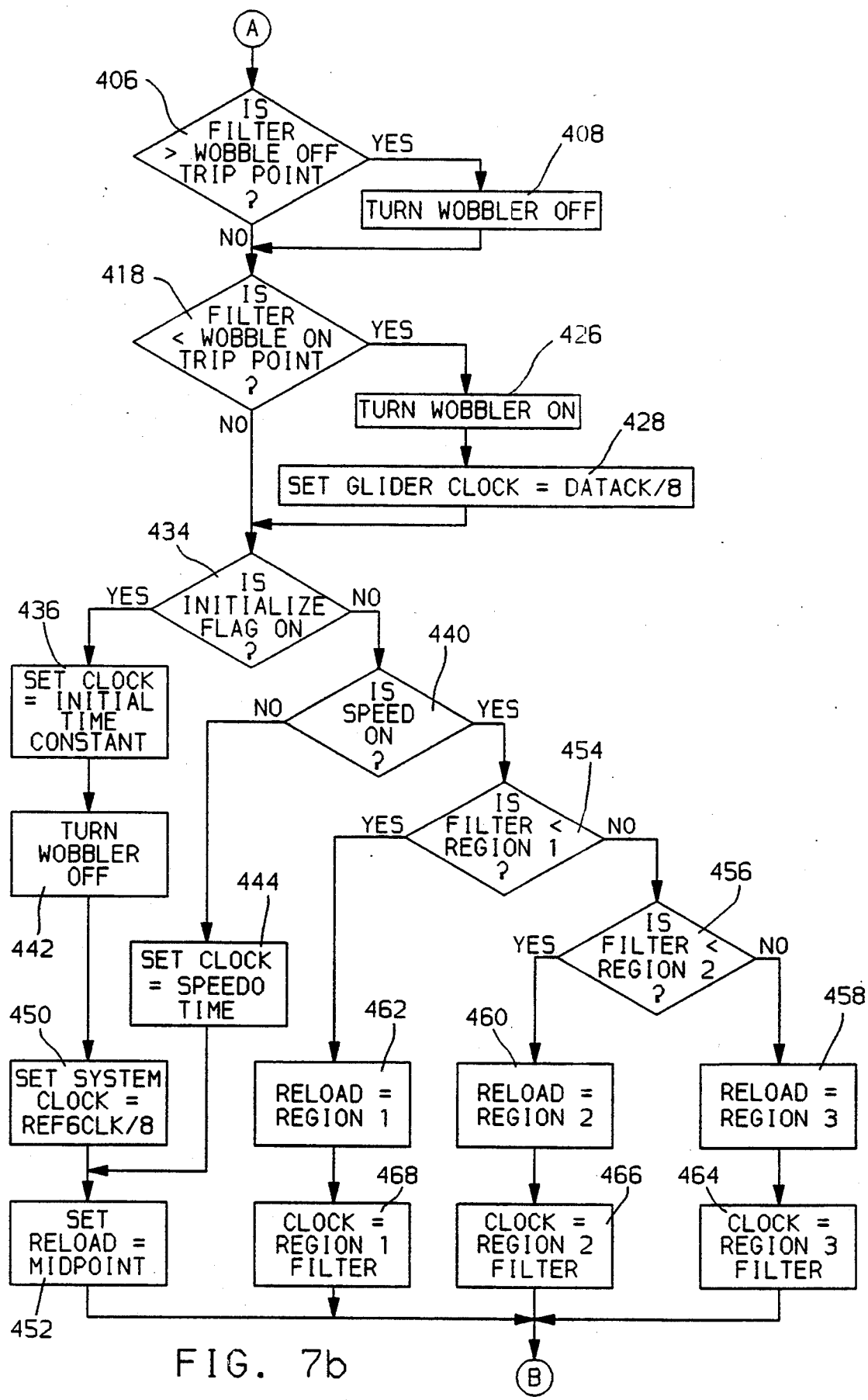

FIGS. 7a and 7b represent a flow diagram for a software subroutine corresponding to the functions of block 409 (FIG. 6) for performing the asymmetrical filtration function. In the subroutine, the variables are defined as follows: RELOAD is the load variable for the first counter and may be viewed as corresponding to the preset value of counter 300 in FIG. 2b; COUNTER is the value of the first counter, corresponding to the value of counter 300 in FIG. 2b; FILTER is the value of the second counter, corresponding to counter 318, FIG. 2b; CLOCK is a variable representing the frequency of both the first and second counters, corresponding to the clock signal on line 289, FIG. 2b; ADVALUE is the input from the sender through the A/D converter 401, corresponding to the signal on bus 280, FIG. 2b; WOBBLE-ON TRIP POINT and WOBBLE-OFF TRIP POINT represent the wobbler on and off points; and MAX VALUE is the maximum value of COUNTER.

ADVALUE is received from the A/D input at the receipt of an interrupt. Block 400 determines whether or not ADVALUE is equal to FILTER. If ADVALUE equals FILTER, the asymmetrical filtering is bypassed and the routine continues through blocks 402, 406, 408 and 418 where it determines whether or not the wobbler should be on or off.

If the wobbler is turned on at block 426, block 428 sets the glider clock appropriately. At block 434 the routine determines if the system is being initialized. If the system is initializing, CLOCK is set at block 436 to the initial time constant, the wobbler is turned off at block 442, the glider clock source is initialized at block 450, and at block 452 RELOAD is set to the mid-point value. At block 470, if the glider clock select is off, the routine moves to the block 472 where the glider clock is decremented. The routine then moves to block 411, where the wobbler routine is run.

Back at block 400, if ADVALUE is not equal to the FILTER, then the asymmetrical filter routine is run beginning at block 404. If ADVALUE is less than FILTER, at block 404, the routine moves to block 410, where COUNTER is compared to its minimum value. If COUNTER is not equal to its minimum value, COUNTER is decremented at block 412 and the routine advances to block 406.

If COUNTER is at the minimum value at block 410, it is reset at block 414 to the value RELOAD and FILTER is checked at block 420 to determine if it is at its minimum value. If FILTER is at its minimum value, then the routine moves to block 406. If FILTER is not at its minimum value, the routine moves to block 430 where FILTER is decremented, to block 448 where a flag is set indicating that the filter has been decremented and then to block 406.

At block 404, if ADVALUE is not less than FILTER, it is known that ADVALUE is greater than FILTER and the routine moves to block 416 where COUNTER is incremented. The routine then moves to block 422 where COUNTER is compared to its maximum value. If COUNTER is not equal to its maximum value, the routine moves to block 406. If COUNTER is equal to its maximum value, the routine moves to block 424 where COUNTER is set equal to RELOAD and then to block 432 where FILTER is incremented.

At block 438 the if FILTER is greater than its maximum value, FILTER is returned to its maximum value at block 446 and the routine moves to block 406. At block 438, if FILTER is not greater than its maximum value, a flag is set at block 448 and the routine continues to block 406.

At block 434, if the initialization flag is set, the routine moves to block 440 where it tests for a signal from the speedometer input. If sufficient time has elapsed and there is not a signal from the speedometer input, the routine moves to block 444 where CLOCK is set to a fast time constant called SPEEDO-TIME CONSTANT and RELOAD is set to the mid-point of the range of COUNTER. The routine moves on to block 470.

If at block 440 there is a signal from the speedometer, the routine moves to block 454 where FILTER is compared to the variable REGION1. If at block 454 FILTER is less than REGION1, the routine moves to block 462 where RELOAD is assigned a REGION1 asymmetry value and to block 468 where CLOCK is set to the REGION1 filter constant.

If at block 454 FILTER is not less than REGION1, the routine moves to block 456 where FILTER is compared to REGION2. If filter is less than REGION2, the routine moves to block 460 where RELOAD is set equal to the REGION2 asymmetry value and at block 466 CLOCK is set equal to the REGION2 filter constant.

If at block 456, FILTER is not less than REGION2, the routine moves to block 458 where RELOAD is set equal to the REGION3 asymmetry value and the routine moves then to block 464 where CLOCK is set to the REGION3 filter constant. Blocks 464, 466 and 468 all continue to block 470 and to the wobbler routine at block 411.

Figure 8:
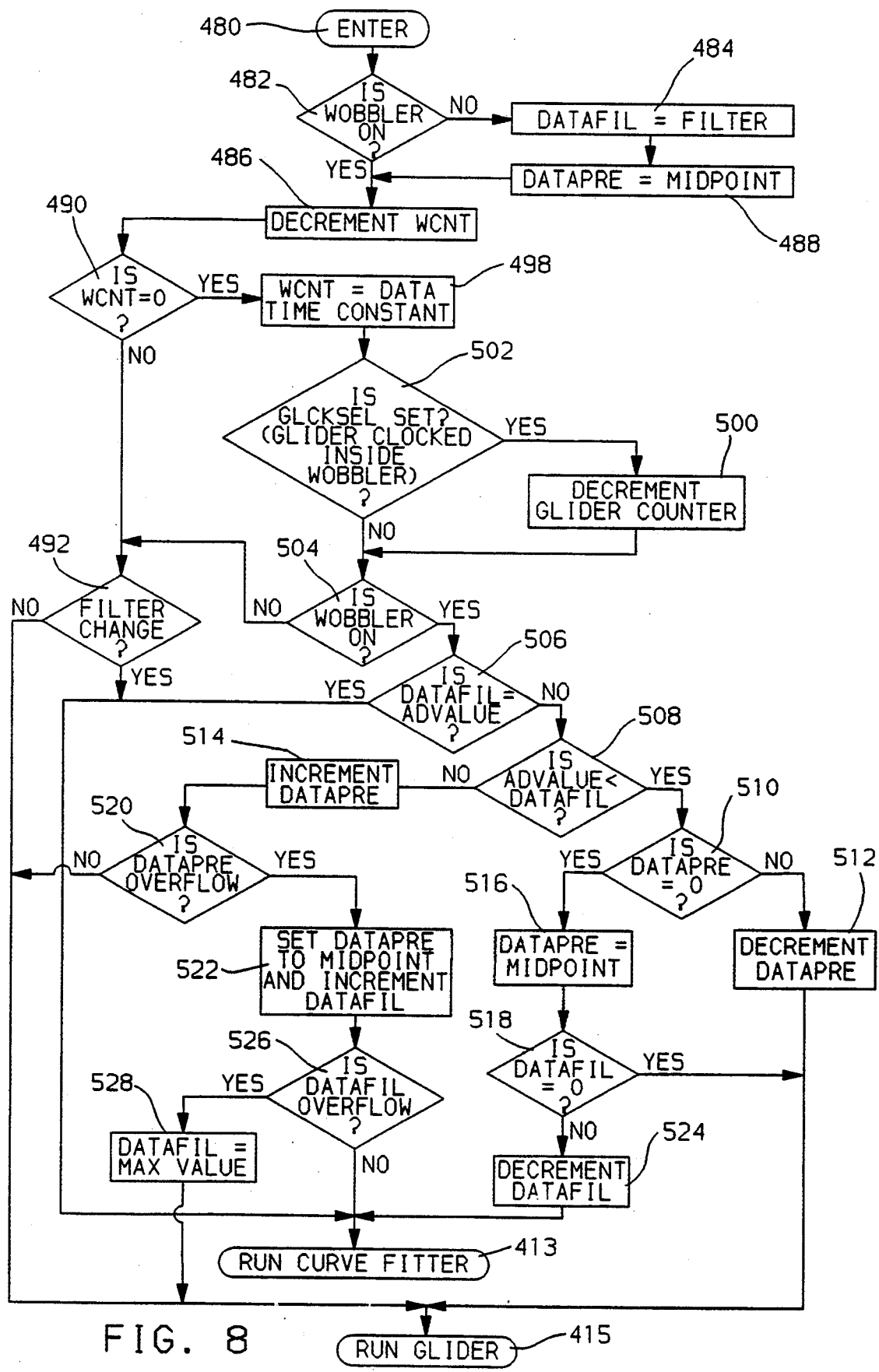

FIG. 8 represents a flow diagram for a software subroutine corresponding to the wobbler functions of block 411 in FIG. 6. In the subroutine, the variables are defined as follows: WCNT is a counter value that dictates how often the wobbler is updated; DATAPRE is the variable representing the wobbler prescaler; and DATAFILL is the wobbler counter output.

The wobbler routine begins at block 480 and moves to block 482 where it checks the wobbler flag to determine if the wobbler is on or off. If the wobbler is off, the routine moves to block 484 where DATAFILL is set equal to FILTER, then to block 488 where DATAPRE is set to its midpoint and then to block 486 where WCNT is decremented.

If at block 482 the wobbler is on, then the routine moves straight to block 486 and then to block 490. At block 490, WCNT is compared to zero. If WCNT is not equal to zero, the wobbler routine is not run and the routine moves to block 492. At block 492, the routine determines if FILTER had changed in the last program loop and, if so, the routine moves to block 413 where the curve fitter is run. The curve fitter comprises a simple look-up table function to compensate for system nonlinearities. If, at block 492, it is determined that FILTER had not changed in the last program loop, the routine moves to block 415 where the glider is run.

If at block 490 the variable WCNT equals zero, the routine moves to block 498 where the variable WCNT is reloaded to DATA TIME CONSTANT. The routine then moves to block 502, where the glider clock flag is checked to determine if the glider clock is to be decremented at block 500. If yes, the routine moves to block 500 and decrements the glider clock counter.

The routine then moves to block 504 where it checks again to determine if the wobbler is on. If not, the routine moves to block 492. If the wobbler is on, the routine moves to block 506 where it compares DATAFILL with the ADVALUE. If the DATAFILL equals ADVALUE, the routine moves to block 413 where the curve fitter is run. If DATAFILL is not equal to ADVALUE, the routine moves to block 508 where it determines if ADVALUE is greater or less than DATAFILL. If DATAFILL is greater than ADVALUE, the routine moves to block 514 where it increments DATAPRE and then to block 520 where it checks for an overflow of DATAPRE. If there is no overflow, the routine moves to block 415 where the glider is run. If there is an overflow of DATAPRE at block 520, the routine moves to block 522 where DATAPRE is reset to its midpoint and where DATAFILL is incremented.

At block 526, DATAFILL is then checked for an overflow. If there is no overflow, the routine moves to block 413 where the curve fitter is run. If there is an overflow, then DATAFILL is reset to its maximum value at block 528 and the routine moves to block 415 where the glider is run. If at block 508 ADVALUE was less than DATAFILL, the routine moves to block 510 where DATAPRE is compared to zero. If DATAPRE is not equal to zero, the routine moves to block 512 where DATAPRE is decremented and the routine continues on to block 415.

At block 510, if DATAPRE is equal to zero, the routine moves to block 516 where DATAPRE is reset to its midpoint value and then to block 518 where DATAFILL is compared to zero. If DATAFILL equals zero at block 518, the routine moves to block 415 where the glider is run. If DATAFILL is not equal to zero, the routine moves to block 524 where DATAFILL is decremented. The routine then continues to block 413 where the curve fitter is run.

Figure 9:
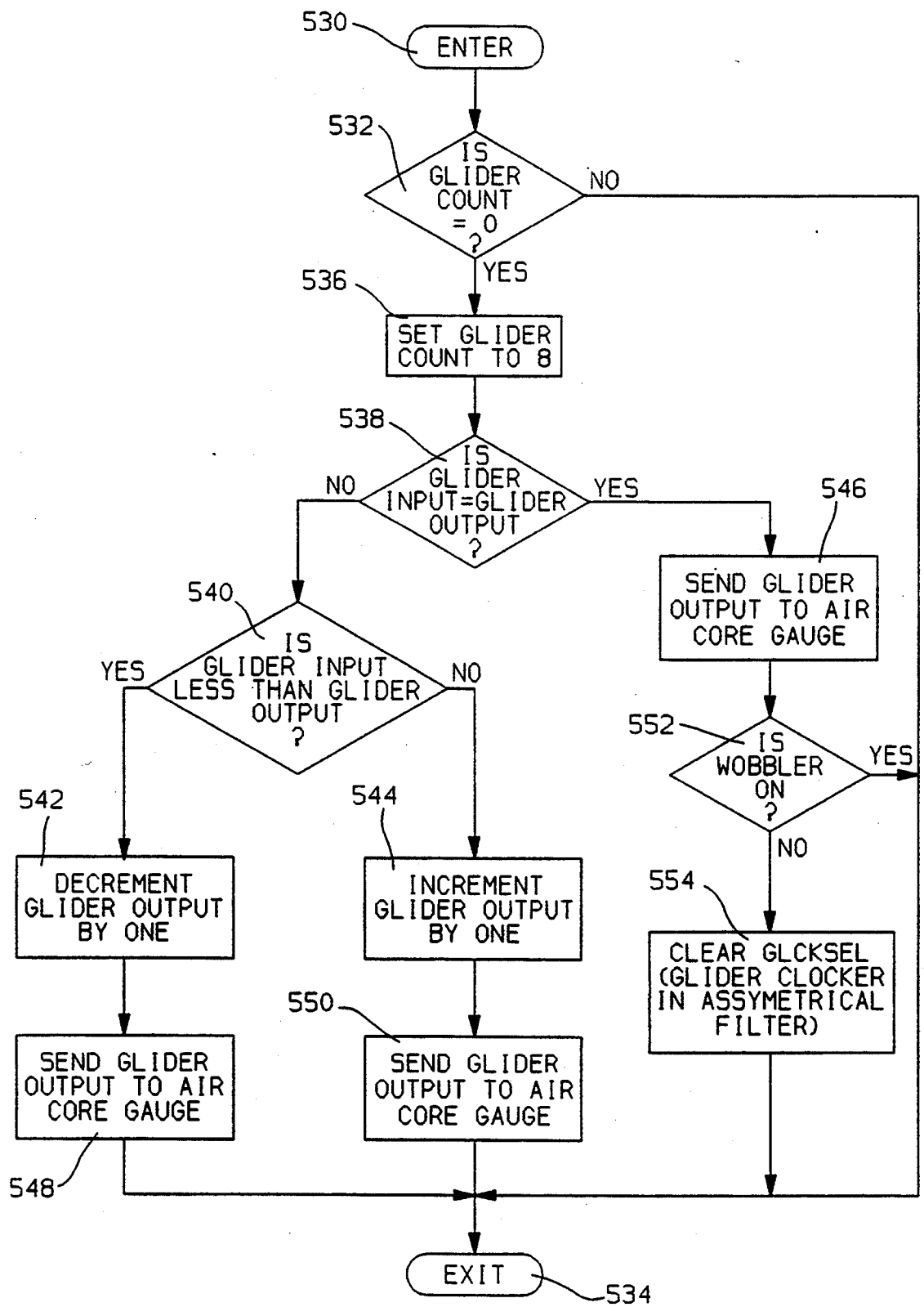

FIG. 9 represents a flow diagram for a software subroutine corresponding to the functions of block 415 in FIG. 6. In the subroutine, the variable GLIDER represents the value of the glider counter, corresponding to counter 350, FIG. 2c; GLIDER COUNT is a timing value used to determine when the glider is run; and INPUT is the value of the glider input received either from the wobbler or the curve fitter.

The glider routine begins at block 530 and moves to block 532, where GLIDER COUNT is compared to zero. If GLIDER COUNT does not equal zero, the glider routine is exited at block 534. If GLIDER COUNT equals zero, the routine continues to block 536, where GLIDER COUNT is set equal to eight.

At block 538, INPUT is compared to GLIDER. If INPUT equals GLIDER, the routine moves to block 546, where the value GLIDER is output to drive a display device. The routine then moves to block 552, where it checks to see if the wobbler is on, if yes, the glider routine is exited at block 534, If the wobbler is off, the glider clock source flag is cleared at block 554.

If, at block 538, INPUT does not equal GLIDER, the routine moves to block 540, where it is determined if INPUT is less than GLIDER. If INPUT is less than GLIDER, then GLIDER is decremented at block 542 and output to a display device at block 548. If INPUT is not less than GLIDER, then GLIDER is incremented at block 544 and output to a display device at block 550. The routine is then exited at block 534.

The above described implementations of this invention are not limiting in scope, but present the preferred implementations. Where digital circuitry is presented, analog or computer alternatives are considered equivalents. Additionally, where analog circuitry is presented, digital or computer alternatives are considered equivalents. Moreover, various improvements and modifications to this invention may occur to those skilled in the art and fall within the scope of this invention as defined below.

The embodiments of the invention in which an exclusive property or privilege is claimed are defined as follows:

1. A filter apparatus for a fuel level display system, comprising:
    means for sensing fuel level and providing a fuel level signal;
    means for filtering the fuel level signal through a long time constant filter and for providing a long period filter output signal;
    means for filtering the fuel level signal through a short time constant filter and for providing a short period filter output signal;
    means for selecting the long period filter output signal if the fuel level is above a trip point and for selecting the short period filter output signal if the fuel level is below the trip point where the trip point corresponds to a predetermined fuel level in-between an empty fuel tank and a full fuel tank; and
    means for indicating the fuel level in a display in response to the selected filter output signal.

2. The apparatus of claim 1 wherein the selecting means comprises means for selecting the long period filter output signal if the fuel level is above a trip point and if the long period output signal is near the short period output signal.

3. The apparatus set forth in claim 1, wherein the means for sensing fuel level comprises a variable resistance fuel sender.

4. The apparatus set forth in claim 1, wherein the long time constant filter means comprises a comparator, an up/down counter responsive to the comparator and having overflow and underflow outputs, and a counter responsive to the overflow and underflow outputs of the up/down counter.

5. The apparatus set forth in claim 1, wherein the short time constant filter means comprises a comparator, an up/down counter responsive to the comparator and having overflow and underflow outputs, and a counter responsive to the overflow and underflow outputs of the up/down counter.

6. The apparatus set forth in claim 1, wherein the long time constant filter means and the short time constant filter means comprise up/down counters responsive to clock signals with clock frequencies, wherein the frequency of the clock signal for the long time constant filter is lower than the frequency of the clock signal for the short time constant filter.

7. The apparatus set forth in claim 4 wherein the comparator is a digital comparator.

8. The apparatus set forth in claim 4 wherein the comparator is an analog comparator.

9. The apparatus set forth in claim 5 wherein the comparator is a digital comparator.

10. The apparatus set forth in claim 5 wherein the comparator is an analog comparator.

11. The apparatus set forth in claim 1 wherein the selecting means comprises first and second comparators, with first and second comparison outputs, the first comparison output coupled to a set input of a flip flop and the second comparison output coupled to a reset input of the flip flop, the selecting means selecting the long period filter output signal when the flip flop is reset and selecting the short period filter output signal when the flip flop is set.

12. The apparatus set forth in claim 1 wherein the display means is an analog gauge.

13. The apparatus set forth in claim 11 wherein the first and second comparators are digital comparators.

14. The apparatus set forth in claim 11 wherein the first and second comparators are analog comparators.

15. An apparatus comprising,
    means for sensing the level of a liquid in a storage tank of a motor vehicle, providing a level sense signal on a sense line connected to an first input of a long period filter and a second input of a short period filter;
    the long period filter, filtering the sense signal through a long time constant filter and outputting a long period filter output signal on a long period filter output line connected to a select means;
    the short period filter, filtering the sense signal through a short time constant filter and outputting a short period filter output signal on a short period filter output line connected to the select means; and the select means comprising comparison means for comparing at least one of the filter output signals to a trip point reference and comprising means for selecting the long period filter output signal if the compared filter output signal is above the trip point reference and for selecting the short period filter output signal if the compared filter output signal is below the trip point reference, where the trip point reference corresponds to a predetermined fuel level in-between an empty and full fuel tank, and wherein the selected signal is used for driving a display.

16. An apparatus for processing fuel sender data provided by a fuel sender, comprising, a long period filter, coupled to a fuel sender for filtering the fuel sender data through the long time constant filter and for outputting a long period filter output signal on a first output data bus;

a short period filter, coupled to the fuel sender for filtering the fuel sender data through a short time constant filter and for outputting a short period filter output signal, the short period filter comprising a counter with a second output data bus, a preset input and a load input, the preset input connected to the first output data bus; and select means, responsive to at least one of the filter output signals, for selectively outputting a select signal to the load input of the counter such that when the load input receiving the select signal, the long period filter output signal is coupled to the second output data bus and otherwise, the short period filter output signal is coupled to the second data bus, whereby, when the fuel level is above a trip point, the long period filter output signal is on the second output data bus and when the fuel level is below the trip point, the short period filter output signal is on the second output data bus where the trip point corresponds to a predetermined fuel level in-between an empty and full fuel tank.

17. An apparatus comprising:

means for sensing a level of fuel in a fuel tank and for providing a level sense signal;

a short period filter comprising a first comparator, a first up/down counter with first underflow and overflow outputs and a first digital counter, the first digital counter counting up and down in response to first overflow and underflow signals from the first overflow and underflow outputs of the first up/down counter, the first digital counter outputting a short period filter output signal responsive to the level sense signal;

a long period filter comprising a second comparator, a second up/down counter with second underflow and overflow outputs and a second digital counter, the second digital counter counting up and down in response to the second overflow and underflow signals from the second overflow and underflow outputs of the second up/down counter, the second digital counter outputting a long period filter output signal responsive to the level sense signal, the long period filter output signal having a time constant longer than a time constant of the short period filter output signal;

means for selecting the long period filter output signal when the fuel level is above a trip point and for selecting the short period output signal when the fuel level is below the trip point, where the trip point corresponds to a predetermined fuel level in-between an empty and full fuel tank; and means for displaying the fuel level in response to the selected output signal.

* * * * *